Dec. 30, 1924.

W. S. SCOTT

PREHEATING RECUPERATIVE FURNACE

Filed Aug. 11, 1923　　2 Sheets-Sheet 1

1,520,911

WITNESSES:
S. H. Voelker
H. M. Biebel

INVENTOR
Wirt S. Scott.
BY
Wesley G. Carr
ATTORNEY

Patented Dec. 30, 1924.

1,520,911

UNITED STATES PATENT OFFICE.

WIRT S. SCOTT, OF BOZMAN, MARYLAND.

PREHEATING RECUPERATIVE FURNACE.

Application filed August 11, 1923. Serial No. 656,868.

*To all whom it may concern:*

Be it known that I, WIRT S. SCOTT, a citizen of the United States, and a resident of Bozman, in the county of Talbot and State of Maryland, have invented a new and useful Improvement in Preheating Recuperative Furnaces, of which the following is a specification.

My invention relates to heat-treating furnaces and particularly to recuperative heat-treating furnaces.

The object of my invention is to provide means for, and a method of, insuring uniformity of temperature in a mass of metal being preheated in a recuperative furnace.

Where large masses of material must be brought to, and maintained at, a predetermined temperature for a predetermined length of time and then cooled slowly, in a heat treating structure, relatively large amounts of heat are wasted, as the furnace structure must, of course, be brought up to substantially a predetermined temperature each time and then permitted to cool with the mass of material.

By employing a recuperative method, part of this heat may be recovered. The amount of heat stored in a given mass of metal increases at a relatively higher rate than in direct proportion, at the higher temperatures. That is, if the specific heat for a particular piece of metal is say .12 for temperature up to say 500° F., the specific heat of the same mass of metal may increase up to the value of .16 at a temperature of 1600° F., thereby causing a relatively larger amount of heat to be stored in the mass of metal than would be stored if the specific heat did not increase.

By employing the recuperative method, it is possible to cause a relatively large proportion of the heat storage in the heated mass of material to be given up to a cooler mass of material that is preheated thereby.

As some support must be provided for the respective masses of material, that part of the material resting more or less directly upon the support will have a lower temperature than that part of the material directly subjected to radiant heat from the heated material which is being permitted to cool. This non-uniformity of temperature throughout the mass of metal may cause undesirable results in the material itself, due to such non-uniformity of temperature and the consequent internal stresses set up thereby.

In practicing my invention, I provide a suitable heat-treating furnace that may be either of the tunnel type or of a suitable enclosed type in which a mass of material is placed in order to be heat treated and is removed therefrom after such process of heat treatment. In the second case, a recuperating furnace structure is provided, into which the mass of material to be cooled and a mass of material to be preheated thereby, are placed in closely adjacent relation. Suitable heating means, preferably of the electric type, is so located as to be closely adjacent to those parts of the mass of material to be heated, that would otherwise be at a lower temperature than other parts of the mass of material. The electric heating elements are so energized as to produce heat to such degree as is effective to cause substantial uniformity of temperature throughout the mass of material.

In the drawings,—

All of the furnace structures hereinbefore enumerated are illustrated schematically only and are such as I employ in carrying out the method embodying my invention, but this method is not limited to such constructions as it is entirely independent of the particular kind of furnace structure actually employed.

Figure 1:
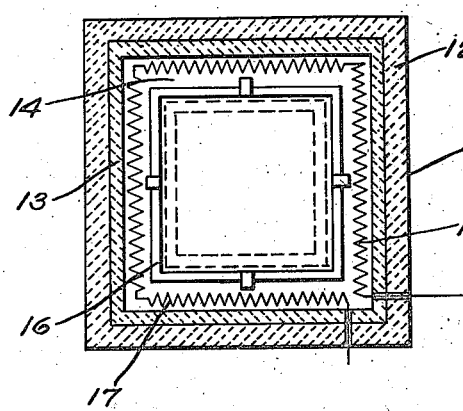
Figure 1 is a view, in horizontal section, of a heat treating furnace.
Figure 2:
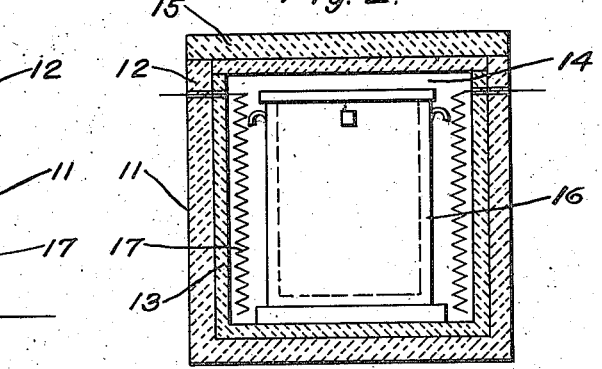
Fig. 2 is a view in vertical section therethrough.

A heat-treating furnace structure 11, illustrated more particularly in Figs. 1 and 2 of the drawings, comprises an outer layer 12 and an inner layer 13 of a plurality of bricks or blocks of a suitable heat-insulating and high-temperature resisting refractory material, that are so located and spaced apart as to provide a furnace chamber 14 of any suitable or desired contour and dimensions. A removable cover 15 of substantially similar construction may be provided to permit of placing within the furnace chamber 14 and of removing therefrom a container 16 for the mass of material to be heat treated. By material I mean to include any kind of metal, or a refractory material of any kind whatsoever that may require heat treatment.

A plurality of electric heating elements 17 may be provided within the furnace chamber 14. Any suitable or desired type of heating element and of supporting means therefor may be provided.

Figure 3:
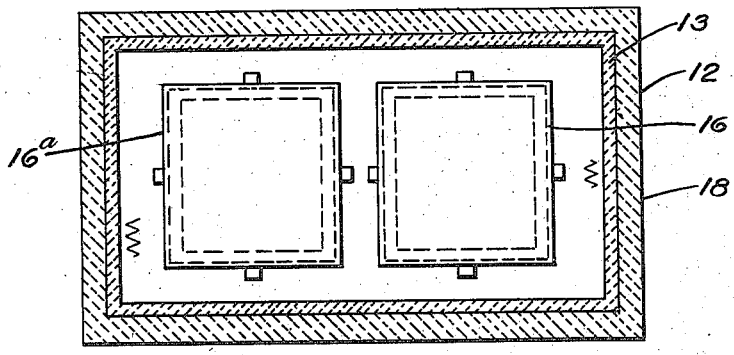
Fig. 3 is a view, in horizontal section, of a recuperative furnace structure.
Figure 4:
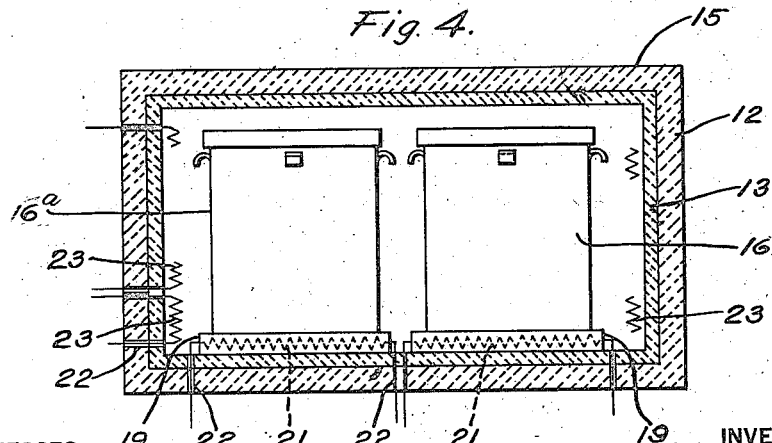
Fig. 4 is a view in vertical section therethrough.

A preheating and recuperative furnace structure is illustrated in Fig. 3 of the drawing and may be of substantially the same type as hereinbefore described in connection with the furnace illustrated in Figs. 1 and 2. When a mass of material located in the container 16 has been suitably heat treated in the furnace structure 11, it is removed therefrom and placed in the recuperating furnace structure that may be designated by the numeral 18, a second container 16a that is filled with a mass of material to be heat treated is placed within the preheating furnace structure 18 and is located adjacent to the heated container 16. The heated container and the mass of material located therein give up a part of the heat stored therein to the adjacent cold container 16a, and the material contained therein. A larger portion of the heat is given up by direct radiation, a lesser portion by indirect radiation, that is, the heat is radiated to the surrounding furnace structure and is reflected to the cold container 16a or is radiated thereto after some lapse of time.

The two containers are located on suitable supporting members 19 which have located therein suitable heating elements 21, the terminals of which extend through suitable insulating bushings 22 and auxiliary heating elements 23 at the side walls of the furnace structure 18 and have their terminals extend through suitable bushings 22 located in the side walls of the furnace structure.

It is apparent that that part of the container 16 to be heated which is located on the support 19 will be at a lower temperature than the part of the container immediately adjacent to the heated container 16. By suitably energizing the heating element 21 in the support 19 upon which rests the cool container 16a, it is possible to bring up the temperature of the cooler portions of the container 16a and of the mass of material located therein so that the material will be preheated to a substantially uniform temperature condition throughout.

If it is found that the use of the heating element 21 in the support 19 is not effective to produce substantial uniformity of temperature, the lower heating element 23 adjacent to the side wall may be energized and if necessary, the upper heating element 23 may also be energized. While I have illustrated specific locations of the various auxiliary heating elements 21 and 23, I do not desire to indicate that these are the only locations in which such auxiliary heating elements may be disposed, as their exact locations will depend to some extent upon the shape of the furnace structure and upon that of the containers, or of the mass of material being heat treated.

Figure 5:
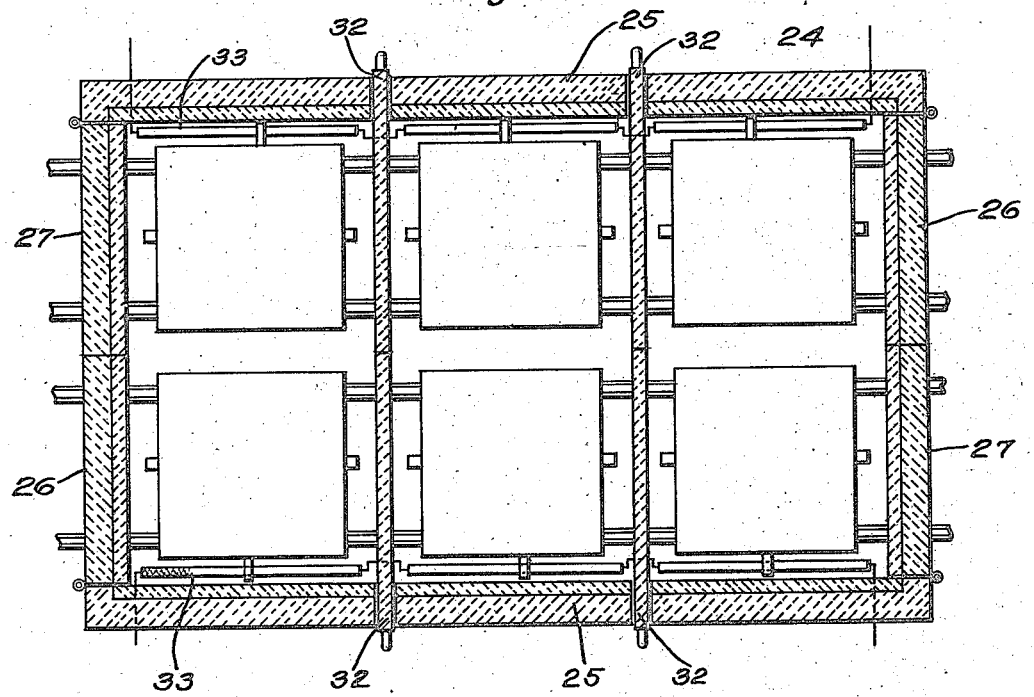
Fig. 5 is a view in horizontal section of a furnace of tunnel type.
Figure 6:
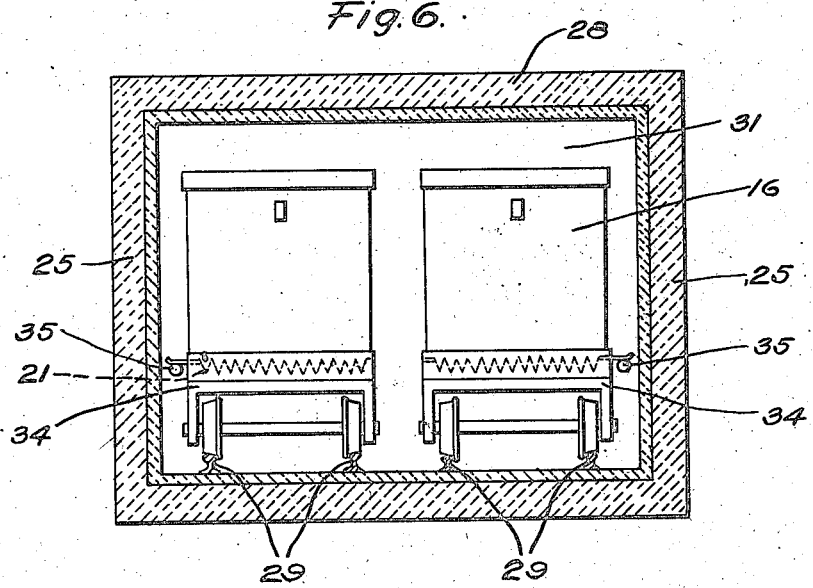
Fig. 6 is a view, in vertical lateral section, of the furnace illustrated in Fig. 5.

Figs. 5 and 6 illustrate a furnace of tunnel type in which a furnace structure 24 comprises a plurality of side walls 25 having an outer and an inner layer of suitable refractory material usually employed in the art. Doors 26 and 27 may be provided for each end of the furnace structure.

An integral roof portion 28 is provided for the furnace structure 24. Pairs of rails 29 traverse a furnace chamber 31 enclosed by the side walls 25 and the cover 28. As it is necessary to provide a plurality of individual compartments in the furnace structure 24, laterally movable partition walls 32 may be provided and extend to the middle portion of the furnace where their inner edges may operatively engage each other.

Suitable heating means, here indicated as electric heating elements 33, may be provided adjacent to the side walls of the furnace structure and these heating elements 33 may be of any suitable or desired construction and may be held in proper operative position by any suitable or desired means.

A plurality of cars 34 are provided which run on the tracks comprising the rails 29 and following the usual method employed in recuperative tunnel furnaces, the cars on one set of rails move in a direction opposite to that in which the other cars move.

In the normal method of use of the recuperative tunnel type of furnace, the two cars 34 with the masses of material located thereon, or with the containers 16 located thereon, in the outer or end compartments are in recuperative preheating operation relatively to each other, that is, the originally cool container is located adjacent to a heated cool container or mass of material. The two containers or masses of material located in the intermediate compartment are being heat treated or are being subjected to the operation of the heat produced by the heating means located within that compartment.

As was hereinbefore discussed in connection with the ordinary pit type of furnace, that part of the mass of material located on the supporting structure is usually at a lower temperature than other parts of the container or of the masses of metal. A heating element 21 is provided in the top surface of each car structure and suitable means are provided for energizing the heating elements, here shown as a stationary trolley wire 35, to which one end of a suitable supply circuit is connected. The return circuit may be through the rails. By suitably energizing the heating elements 21 in the cars 34, located in the end compartments, it is possible to insure substantially uniform temperature in the masses of metal being preheated, thereby reducing any stresses that might otherwise be caused if the temperature were not uniform.

I obtain another result that is of importance in the carrying out of heat treating operations, namely a speeding up of the heat-treating process by the use of the auxiliary heating elements 21 whereby a greater output per furnace structure is obtained.

I am aware that recuperating furnace structures and methods have been employed heretofore, but I am not aware that auxiliary heating means have been provided as is disclosed in the present application whereby a substantial uniformity of temperature within the mass of metal being preheated is obtained, and I believe this provision of such heating elements and their use to be novel.

Various modifications and changes may be made herein without departing from the spirit and scope of the invention, as set forth in the appended claims.

I claim as my invention:

1. The method of heat treating a mass of material in a recuperating furnace which comprises the heating, by an auxiliary heating means, of that portion of the colder mass of material that is at a lower temperature than that portion thereof subjected to the influence of an adjacent hot mass of material.

2. The step in the method of heating a mass of material in a recuperating furnace when the mass of material to be heated is placed adjacent to a mass of material to be cooled in a heat insulating furnace structure, which comprises the heating, by an auxiliary heating means, of that portion of the mass of material to be heated which is not subjected to the heat radiated by the hot mass of material being cooled.

3. The method of insuring uniformity of preheating of a mass of material subjected to the heat of a mass of material being cooled in a recuperating furnace structure which comprises the heating, by an auxiliary heating means, of that portion of the mass of material being heated, that is at a lower temperature than other portions thereof.

4. The method of heat treating a mass of material in a recuperating furnace which comprises the energization of an auxiliary heating means, located adjacent to that part of the mass of material being preheated that is at a lower temperature than the other portions thereof, to insure substantial uniformity of temperature of said mass of material.

5. The method of heat treating a mass of material in a recuperating furnace which comprises the energization of an electric heating means, located adjacent to that part of the mass of material being preheated that is at a lower temperature than the other portions thereof, to insure substantial uniformity of temperature of said mass of material.

6. The method of heat treating a mass of material that comprises the steps of locating the same adjacent to a heated mass of material and subjecting it to the influence of the heat from said heated mass and simultaneously heating that portion of the cooler mass that is at a lower temperature than other portions thereof, by auxiliary heating means to insure substantially uniform heating of said mass of material, then subjecting said first mass of material to the influence of other heating means and then locating said mass of material adjacent to a cold mass of material to heat the same.

7. The method of heat treating which comprises locating an initially cold mass of material and a hot mass of material in heat interchanging relation and simultaneously heating that portion of said initially cold mass that is at a lower temperature than other portions thereof, by auxiliary heating means to insure substantial uniformity of temperature therethrough, then subjecting said preheated first mass of material to heat to effect predetermined heat treatment thereof, and then locating said heated mass of material adjacent to a cold mass to preheat the same.

8. The method of heat treating masses of material in a recuperating furnace which comprises placing a plurality of pairs of masses of material in heat interchanging relation, each pair comprising an initially cold mass and a hot mass of material, simultaneously subjecting each cold mass of material to the action of auxiliary heating means so located as to insure substantially uniform heating of the respective masses of material, then subjecting the uniformly preheated masses of material to heat to heat-treat the same, then placing the heat treated masses in heat interchanging relation to other initially cold masses to preheat the same, and, simultaneously with such heat exchange subjecting each of said last named cold masses of material to the influence of auxiliary heating means so located as to insure substantially uniform heating thereof.

In testimony whereof, I have hereunto subscribed my name this 8th day of August, 1923.

WIRT S. SCOTT.